United States Patent
Whitney et al.

(10) Patent No.: US 9,068,517 B2
(45) Date of Patent: Jun. 30, 2015

(54) COORIDNATED TORQUE CONTROL OPERATION WITH DE-ENERGIZED THROTTLE

(75) Inventors: Christopher E. Whitney, Highland, MI (US); Paul A. Bauerle, Fenton, MI (US); Ning Jin, Novi, MI (US); Todd R. Shupe, Milford, MI (US); Robert C. Simon, Jr., Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1603 days.

(21) Appl. No.: 12/431,147

(22) Filed: Apr. 28, 2009

(65) Prior Publication Data

US 2009/0276128 A1 Nov. 5, 2009

Related U.S. Application Data

(60) Provisional application No. 61/050,363, filed on May 5, 2008.

(51) Int. Cl.
| | |
|---|---|
| *F16H 61/00* | (2006.01) |
| *F16H 61/12* | (2010.01) |
| *F02D 11/10* | (2006.01) |
| *F02D 31/00* | (2006.01) |
| *F02D 37/02* | (2006.01) |
| *F02D 41/00* | (2006.01) |
| *F02P 5/15* | (2006.01) |
| *F02D 9/02* | (2006.01) |
| *F02D 41/14* | (2006.01) |
| *F02D 41/22* | (2006.01) |

(52) U.S. Cl.
CPC ...... *F02D 11/107* (2013.01); *F02D 2009/0277* (2013.01); *F02D 31/001* (2013.01); *F02D 37/02* (2013.01); *F02D 41/0087* (2013.01); *F02D 2041/1422* (2013.01); *F02D 2041/227* (2013.01); *F02D 2200/1004* (2013.01); *F02D 2250/18* (2013.01); *F02P 5/1508* (2013.01); *Y02T 10/46* (2013.01)

(58) Field of Classification Search
CPC .......... F02D 11/107; F02D 2009/0277; F02D 2011/102; F02D 2200/0404
USPC ...................... 701/54, 62, 104, 105
See application file for complete search history.

(56) References Cited

U.S. PATENT DOCUMENTS

| | | | | |
|---|---|---|---|---|
| 5,447,133 | A * | 9/1995 | Kamio et al. | 123/396 |
| 5,562,086 | A * | 10/1996 | Asada et al. | 123/568.21 |
| 5,601,063 | A * | 2/1997 | Ohashi et al. | 123/396 |
| 6,405,587 | B1 | 6/2002 | Livshiz | |
| 7,433,775 | B2 | 10/2008 | Livshiz | |
| 7,463,970 | B2 | 12/2008 | Livshiz | |
| 7,650,219 | B2 | 1/2010 | Livshiz et al. | |

\* cited by examiner

*Primary Examiner* — John Q Nguyen
*Assistant Examiner* — Kyung Kim

(57) ABSTRACT

An engine control system comprises an air control module and a spark control module. The air control module controls a throttle valve based on a first desired torque when the throttle valve is in an operable state. The spark control module controls spark advance based on the first desired torque and a second desired torque when the throttle valve is in a fault state. The throttle valve is maintained in a predetermined fault position when in the fault state.

20 Claims, 4 Drawing Sheets

COORIDNATED TORQUE CONTROL OPERATION WITH DE-ENERGIZED THROTTLE

CROSS-REFERENCE TO RELATED APPLICATIONS

This application claims the benefit of U.S. Provisional Application No. 61/050,363, filed on May 5, 2008. The disclosure of the above application is incorporated herein by reference in its entirety.

FIELD

The present disclosure relates to engine torque control and more particularly to engine torque control with a de-energized throttle valve.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Airflow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the air and fuel to the cylinders increases the torque output of the engine.

Engine control systems have been developed to control engine torque output to achieve a desired predicted torque. Traditional engine control systems, however, do not control the engine torque output as accurately as desired. Further, traditional engine control systems do not provide as rapid of a response to control signals as is desired or coordinate engine torque control among various devices that affect engine torque output.

For example, traditional engine control systems do not coordinate engine torque control when they are in a default throttle mode. The default throttle mode is a mode where the throttle is de-energized because it has been diagnosed to have failed. When de-energized, the throttle is set to a predetermined position (i.e., a spring-loaded position) that allows enough airflow for the engine to "limp home" (i.e., to drive the vehicle to a nearby location for repair).

SUMMARY

An engine control system comprises an air control module and a spark control module. The air control module controls a throttle valve based on a first desired torque when the throttle valve is in an operable state. The spark control module controls spark advance based on the first desired torque and a second desired torque when the throttle valve is in a fault state. The throttle valve is maintained in a predetermined fault position when in the fault state.

In other features, the engine control system further comprises a cylinder control module. The cylinder control module selectively disables combustion within one or more cylinders of an engine based on the first and second desired torques when the throttle valve is in the fault state.

In still other features, the engine control system further comprises an engine speed control module. The engine speed control module determines the first desired torque based on a minimum torque, a reserve torque, and a proportional-integral (PI) offset determined based on a difference between a desired engine speed and a measured engine speed. The engine speed control module determines the second desired torque based on a proportional offset determined based on the difference, the reserve torque, and a run torque.

In further features, the engine control system further comprises a trajectory control module. The trajectory module sets the desired engine speed to a first predetermined idle speed when the throttle valve is in the operable state and increases the desired engine speed to a second predetermined idle speed when the throttle valve is in the fault state.

In still further features, the engine speed control module disables determining the first desired torque based on the minimum torque when the throttle valve is in the fault state.

In other features, the engine speed control module sets the reserve torque to zero when the throttle valve is in the fault state.

In still other features, the engine speed control module determines the proportional and PI offsets based on first gains when the throttle valve is in the operable state and determines the proportional and PI offsets based on second gains when the throttle valve is in the fault state. The first gains are one of greater than and less than the second gains.

In further features, the engine speed control module sets the first desired torque to a predetermined minimum when the first desired torque is less than the predetermined minimum while the throttle valve is in the operable state and outputs the first desired torque when the first desired torque is less than the predetermined minimum while the throttle valve is in the fault state.

In still further features, the engine control system further comprises a torque estimation module. The torque estimation module determines an estimated air torque based on current operating conditions and a predetermined spark advance and sets a maximum torque capacity of an engine equal to the estimated air torque when the throttle valve is in the fault state.

In other features, the engine control system further comprises a transmission control module. The transmission control module controls a gear ratio of a transmission based on the maximum torque capacity.

An engine control method comprises controlling a throttle valve based on a first desired torque when the throttle valve is in an operable state and controlling spark advance based on the first desired torque and a second desired torque when the throttle valve is in a fault state. The throttle valve is maintained in a predetermined fault position when in the fault state.

In other features, the engine control method further comprises selectively disabling combustion within one or more cylinders of an engine based on the first and second desired torques when the throttle valve is in the fault state.

In still other features, the engine control method further comprises determining the first desired torque based on a minimum torque, a reserve torque, and a proportional-integral (PI) offset determined based on a difference between a desired engine speed and a measured engine speed; and determining the second desired torque based on a proportional offset determined based on the difference, the reserve torque, and a run torque.

In further features, the engine control method further comprises setting the desired engine speed to a first predetermined idle speed when the throttle valve is in the operable state and increasing the desired engine speed to a second predetermined idle speed when the throttle valve is in the fault state.

In still further features, the engine control method further comprises disabling determining the first desired torque based on the minimum torque when the throttle valve is in the fault state.

In other features, the engine control method further comprises setting the reserve torque to zero when the throttle valve is in the fault state.

In still other features, the engine control method further comprises determining the proportional and PI offsets based on first gains when the throttle valve is in the operable state and determining the proportional and PI offsets based on second gains when the throttle valve is in the fault state. The first gains are one of greater than and less than the second gains.

In further features, the engine control method further comprises setting the first desired torque to a predetermined minimum when the first desired torque is less than the predetermined minimum while the throttle valve is in the operable state and outputting the first desired torque when the first desired torque is less than the predetermined minimum while the throttle valve is in the fault state.

In still further features, the engine control method further comprises determining an estimated air torque based on current operating conditions and a predetermined spark advance and setting a maximum torque capacity of an engine equal to the estimated air torque when the throttle valve is in the fault state.

In other features, the engine control method further comprises controlling a gear ratio of a transmission based on the maximum torque capacity.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
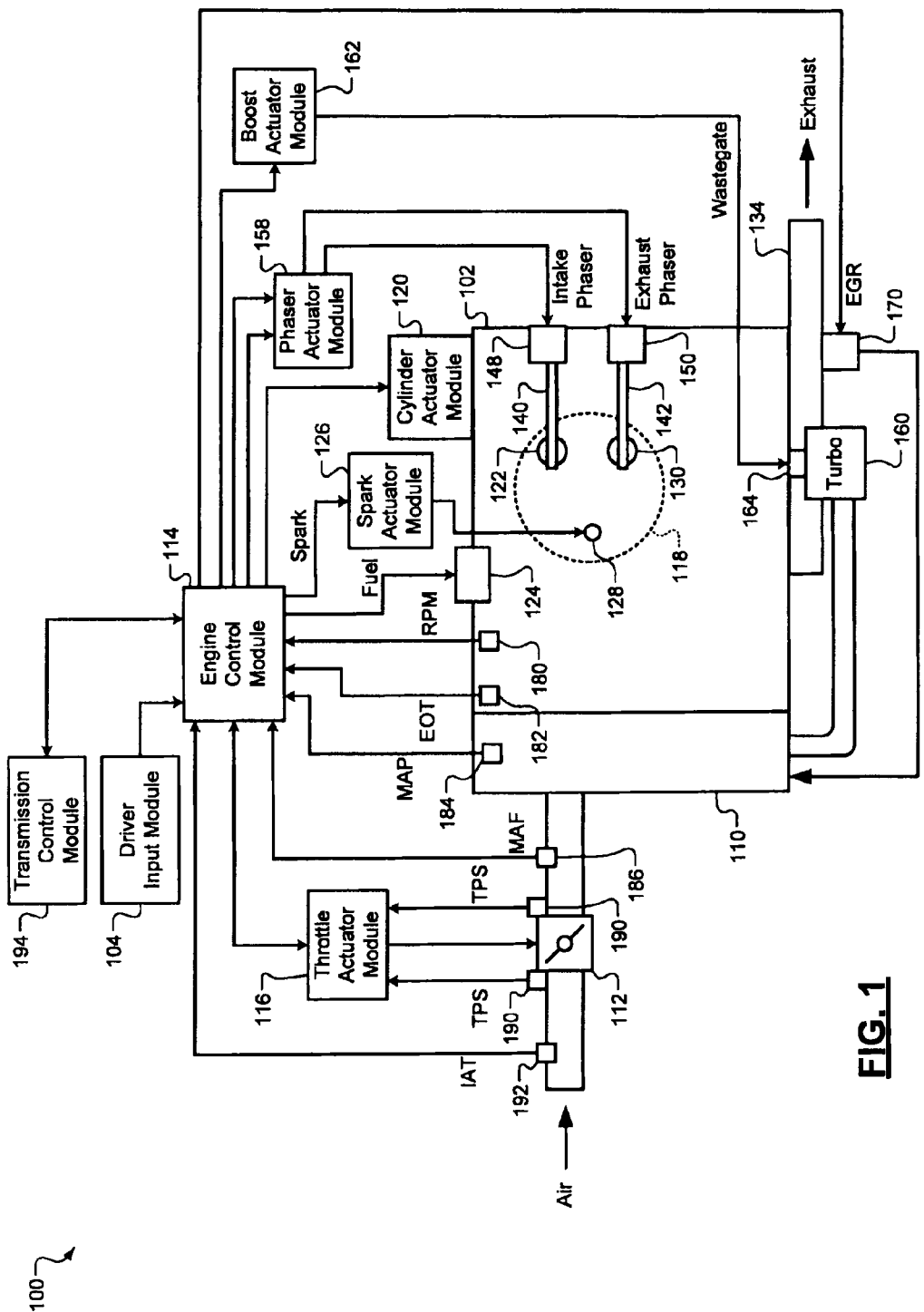
FIG. 1 is a functional block diagram of an exemplary implementation of an engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

To coordinate engine torque control when in a default throttle mode, the engine control system of the present disclosure includes an actuation mode module. Due to a throttle being unavailable during the default throttle mode, the actuation mode module reroutes a torque request originally for a first torque control module that actuates the throttle based on the torque request. The torque request is rerouted to a second torque control module that actuates available actuators (e.g., a spark plug and a fuel injection system) based on the torque request. In addition, the engine control system includes an engine speed (RPM) control module that determines torque requests based on different parameters when in the default throttle mode.

Referring now to FIG. 1, a functional block diagram of an exemplary implementation of an engine system 100 is presented. The engine system 100 includes an engine 102 that combusts an air/fuel mixture to produce drive torque for a vehicle based on a driver input module 104. Air is drawn into an intake manifold 110 through a throttle valve 112. An engine control module (ECM) 114 commands a throttle actuator module 116 to regulate opening of the throttle valve 112 to control the amount of air drawn into the intake manifold 110.

Air from the intake manifold 110 is drawn into cylinders of the engine 102. While the engine 102 may include multiple cylinders, for illustration purposes, a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders to improve fuel economy.

Air from the intake manifold 110 is drawn into the cylinder 118 through an intake valve 122. The ECM 114 controls the amount of fuel injected by a fuel injection system 124. The fuel injection system 124 may inject fuel into the intake manifold 110 at a central location or may inject fuel into the intake manifold 110 at multiple locations, such as near the intake valve of each of the cylinders. Alternatively, the fuel injection system 124 may inject fuel directly into the cylinders.

The injected fuel mixes with the air and creates the air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC), the point at which the air/fuel mixture is most compressed.

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control the exhaust valves of multiple banks of cylinders. The cylinder actuator module 120 may deactivate cylinders by halting provision of fuel and spark and/or disabling their exhaust and/or intake valves.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114.

The engine system 100 may include a boost device that provides pressurized air to the intake manifold 110. For example, FIG. 1 depicts a turbocharger 160. The turbocharger 160 is powered by exhaust gases flowing through the exhaust system 134, and provides a compressed air charge to the intake manifold 110. The air used to produce the compressed air charge may be taken from the intake manifold 110.

A wastegate 164 may allow exhaust gas to bypass the turbocharger 160, thereby reducing the turbocharger's output (or boost). The ECM 114 controls the turbocharger 160 via a boost actuator module 162. The boost actuator module 162 may modulate the boost of the turbocharger 160 by controlling the position of the wastegate 164. The compressed air charge is provided to the intake manifold 110 by the turbocharger 160. An intercooler (not shown) may dissipate heat that is generated when air is compressed and that may also be increased by proximity to the exhaust system 134. Alternate engine systems may include a supercharger that provides compressed air to the intake manifold 110 and is driven by the crankshaft.

The engine system 100 may include an exhaust gas recirculation (EGR) valve 170, which selectively redirects exhaust gas back to the intake manifold 110. The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum may be measured, where engine vacuum is the difference between ambient air pressure and the pressure within the intake manifold 110. The mass of air flowing into the intake manifold 110 may be measured using a mass air flow (MAF) sensor 186. In various implementations, the MAF sensor 186 may be located in a housing with the throttle valve 112.

The throttle actuator module 116 may monitor the position of the throttle valve 112 using one or more throttle position sensors (TPS) 190. The ambient temperature of air being drawn into the engine system 100 may be measured using an intake air temperature (IAT) sensor 192. The ECM 114 may use signals from the sensors to make control decisions for the engine system 100. The ECM 114 may communicate with a transmission control module 194 to coordinate shifting gears in a transmission (not shown). For example, the ECM 114 may reduce torque during a gear shift.

Various control mechanisms (i.e., actuators) of the engine system 100 may vary respective engine parameters of the engine 102. For example, the throttle actuator module 116 may change the blade position (i.e., actuator position), and therefore the opening area, of the throttle valve 112. Similarly, the spark actuator module 126 may control an actuator position that corresponds to an amount of a spark advance. Other actuators include the boost actuator module 162, the EGR valve 170, the phaser actuator module 158, the fuel injection system 124, and the cylinder actuator module 120. Actuator positions with respect to these actuators may correspond to boost pressure, EGR valve opening, intake and exhaust cam phaser angles, air/fuel ratio, and number of cylinders activated, respectively.

Figure 2:
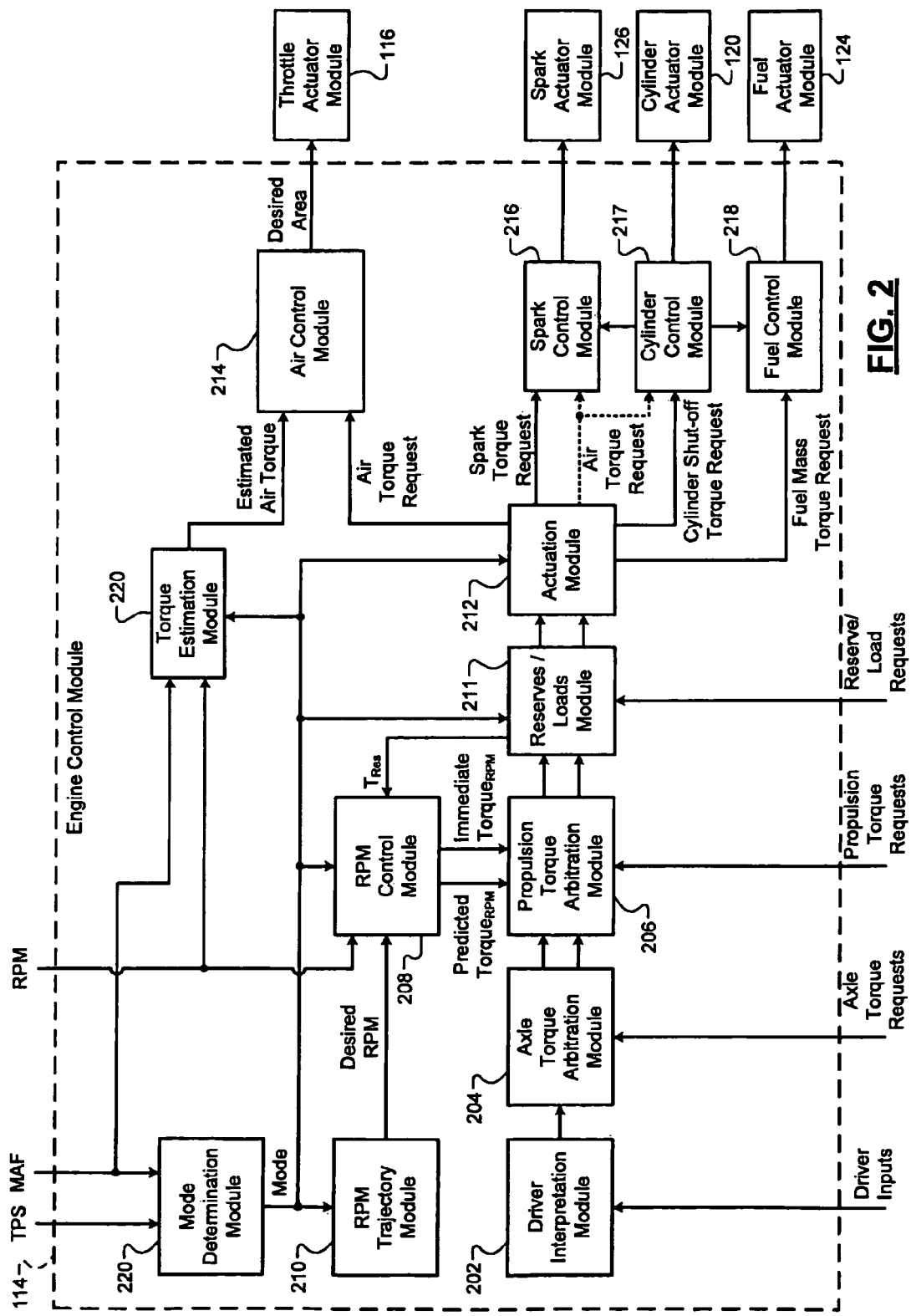
FIG. 2 is a functional block diagram of an exemplary implementation of an engine control module according to the principles of the present disclosure.

Referring now to FIG. 2, a functional block diagram of an exemplary implementation of the ECM 114 is presented. The ECM 114 includes a driver interpretation module 202. The driver interpretation module 202 receives driver inputs from the driver input module 104. For example, the driver inputs may include an accelerator pedal position. The driver interpretation module 202 outputs a driver-requested torque.

An exemplary implementation of the ECM 114 includes an axle torque arbitration module 204. The axle torque arbitration module 204 arbitrates between a driver input from the driver input module 104 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 204 outputs a predicted torque and an immediate torque based on the results of arbitrating between the received torque requests. The predicted torque is the amount of torque that the ECM 114 prepares the engine 102 to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while the air flow response to cam phaser or throttle adjustments may be slower as changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 204 may output the predicted torque and the immediate torque to a propulsion torque arbitration module 206. The predicted and immediate torques received by the propulsion torque arbitration module 206 are converted from an axle torque domain (torque at the wheels) into a propulsion torque domain (torque at the crankshaft). This conversion may occur before or after receipt by the propulsion torque arbitration module 206.

The propulsion torque arbitration module 206 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine 102. The propulsion torque arbitration module 206 may still receive these shutoff requests so that, for example, appropriate data can be fed back to other torque requesters. For example, all other torque requestors may be informed that they have lost arbitration.

An RPM control module 208 also outputs a predicted and an immediate torque request to the propulsion torque arbitration module 206. The propulsion torque arbitration module 206 may simply select the torque requests from the RPM control module 208 when the ECM 114 is in RPM mode. RPM mode may be enabled when the driver takes their foot off the pedal. RPM mode may then be used for vehicle coastdown as well as when the vehicle is idling. RPM mode may be selected when the predicted torque requested by the axle torque arbitration module 204 is less than a calibrated torque value.

The RPM control module 208 receives the RPM from the RPM sensor 180 and a desired RPM from an RPM trajectory module 210. The RPM trajectory module 210 determines a desired RPM for RPM mode. For example only, the RPM trajectory module 210 may output a linearly decreasing RPM until the RPM reaches an idle RPM. The RPM trajectory module 210 may then continue outputting the idle RPM. The idle RPM is set to a first predetermined RPM.

In various implementations, the RPM trajectory module 210 may function as described in commonly assigned U.S. Pat. No. 6,405,587, issued on Jun. 18, 2002 and entitled "System and Method of Controlling the Coastdown of a Vehicle," the disclosure of which is expressly incorporated herein by reference in its entirety.

A reserves/loads module 211 receives the arbitrated predicted and immediate torque requests from the propulsion torque arbitration module 206. Various engine operating conditions may affect the engine torque output. In response to these conditions, the reserves/loads module 211 may create a torque reserve by increasing the predicted torque request.

For example only, a catalyst light-off process or a cold start emissions reduction process may directly vary spark advance for an engine. The reserves/loads module 211 may therefore increase the predicted torque request to counteract the effect of that spark advance on the engine torque output. In another example, the air/fuel ratio of the engine and/or the mass air flow may be directly varied, such as by diagnostic intrusive equivalence ratio testing and/or new engine purging. Corresponding predicted torque requests may be made to offset changes in the engine torque output during these processes.

The reserves/loads module 211 may also create a reserve in anticipation of a future load, such as the engagement of the air conditioning compressor clutch or power steering pump operation. The reserve for air conditioning (A/C) clutch engagement may be created when the driver first requests air conditioning. Then, when the A/C clutch engages, the reserves/loads module 211 may add the expected load of the A/C clutch to the immediate torque request. The reserves/loads module 211 provides an indication of the reserve torque ($T_{Res}$) to the RPM control module 208, which is discussed further below in the context of the exemplary embodiment of FIG. 3.

An actuation module 212 receives the predicted and immediate torque requests from the reserves/loads module 211. The actuation module 212 determines how the predicted and immediate torque requests will be achieved. The actuation module 212 may be engine type specific, with different control schemes for gas engines versus diesel engines. In various implementations, the actuation module 212 may define the boundary between modules prior to the actuation module 212, which are engine independent, and modules that are engine dependent.

For example, in a gas engine, the actuation module 212 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 212 may generate an air torque request based on the predicted torque request. The air torque request may be equal to the predicted torque request, causing air flow to be set so that the predicted torque request can be achieved by changes to other actuators.

An air control module 214 may determine desired actuator values for slow actuators based on the air torque request. For example, the air control module 214 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 214 may also determine an amount of opening of the EGR valve 170.

In gas systems, the actuation module 212 may also generate a spark torque request, a cylinder shut-off torque request, and a fuel mass torque request. The spark torque request may be used by a spark control module 216 to determine how much to retard the spark (which reduces the engine torque output) from a calibrated spark advance.

The cylinder shut-off torque request may be used by a cylinder control module 217 to determine how many cylinders to deactivate. The cylinder control module 217 may instruct the cylinder actuator module 120 to deactivate one or more cylinders of the engine 102. In various implementations, a predefined group of cylinders may be deactivated jointly. The cylinder control module 217 may also instruct a fuel control module 218 to stop providing fuel for deactivated cylinders and may instruct the spark control module 216 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 218 to vary the amount of fuel provided to each cylinder. For example only, the fuel control module 218 may determine a fuel mass that, when combined with the current amount of air per cylinder, yields stoichiometric combustion. The fuel control module 218 may instruct the fuel actuator module 124 to inject this fuel mass for each activated cylinder. During normal engine operation, the fuel control module 218 may attempt to maintain a stoichiometric air/fuel ratio.

The fuel control module 218 may increase the fuel mass above the stoichiometric value to increase engine torque output and may decrease the fuel mass to decrease engine torque output. In various implementations, the fuel control module 218 may receive a desired air/fuel ratio that differs from stoichiometry. The fuel control module 218 may then determine a fuel mass for each cylinder that achieves the desired air/fuel ratio. In diesel systems, fuel mass may be the primary actuator for controlling engine torque output.

A torque estimation module 220 may estimate torque output of the engine 102. This estimated torque may be used by the air control module 228 to perform closed-loop control of engine air flow parameters, such as throttle area, MAP, and phaser positions. For example only, a torque relationship such as $$T = f(APC, S, I, E, AF, OT, \#) \qquad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 220 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque or an unmanaged torque. The estimated air torque (i.e., the unmanaged torque) is an estimate of how much torque the engine 102 could generate at the current air flow if spark retard was removed (i.e., spark advance was set to the calibrated spark advance value) with combustion within all of the cylinders.

The air control module 214 may generate a desired manifold absolute pressure (MAP) signal. The desired MAP signal may be used to control the boost actuator module 164. The boost actuator module 164 then controls one or more turbochargers and/or superchargers. The air control module 214 may also generate a desired air per cylinder (APC) signal, which may be used to control the phaser actuator module 158. The phaser actuator module 158 then controls positions of the intake and/or exhaust cam phasers 148 and 150.

The air control module 214 may generate a desired area signal, which is output to the throttle actuator module 116. The throttle actuator module 116 then regulates the throttle valve 112 to produce the desired throttle area. The air control module 214 may generate the desired area signal based on an inverse torque model and the air torque request. The air control module 214 may use the estimated air torque and/or the MAF signal in order to perform closed loop control. For example, the desired area signal may be controlled to minimize a difference between the estimated air torque and the air torque request.

Referring back to the spark control module 216, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#) \qquad (2)$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

The approach the actuation module 212 takes in achieving the immediate torque request may be determined by a mode setting. The mode setting may be provided to the actuation module 212, such as by a mode determination module 220. The modes may include, for example, an inactive mode, a pleasible mode, a maximum range mode, and an auto actuation mode.

In the inactive mode, the actuation module 212 may ignore the immediate torque request and attempt to achieve the predicted torque request. The actuation module 212 may therefore set the spark torque request, the cylinder shut-off torque request, and the fuel mass torque request to the predicted torque request, which maximizes torque output for the current engine air flow conditions. Alternatively, the actuation module 212 may set these requests to predetermined (such as out-of-range high) values to disable torque reductions from retarding spark, deactivating cylinders, or reducing the fuel/air ratio.

In the pleasible mode, the actuation module 212 may attempt to achieve the immediate torque request by adjusting only spark advance. The actuation module 212 may therefore output the predicted torque request as the air torque request and the immediate torque request as the spark torque request. The spark control module 216 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 212 may output the predicted torque request as the air torque request and the immediate torque request as the spark torque request. In addition, the actuation module 212 may generate a cylinder shut-off torque request that is low enough to enable the spark control module 216 to achieve the immediate torque request. In other words, the actuation module 212 may decrease the cylinder shut-off torque request (thereby deactivating cylinders) when reducing spark advance alone is unable to achieve the immediate torque request.

In the auto actuation mode, the actuation module 212 may decrease the air torque request based on the immediate torque request. For example, the air torque request may be reduced only so far as is necessary to allow the spark control module 216 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

The mode determination module 220 selects the mode of operation. According to the present disclosure, the mode determination module 220 selects the mode from the above modes and a default throttle mode. More specifically, the mode determination module 220 determines whether the ECM 114 is in the default throttle mode or whether to enable the default throttle mode. For example only, the mode determination module 220 may determine whether the ECM 114 is in the default throttle mode based on, but not limited to, the TPS signal from the TPS sensors 190 and/or the MAF signal.

The mode determination module 220 enables the default throttle mode when the throttle valve 112 has been diagnosed to have failed. For example only, a fault or failure may diagnosed in the throttle valve 112 based on the TPS signal and/or the MAF signal. The throttle valve 112 may be diagnosed to have failed if the TPS signal indicates that the throttle valve 112 is not moving after actuation is requested. The throttle valve 112 may be diagnosed to have failed if TPS signal and/or the MAF signal indicate values that are not equal to those expected. In another implementation, the mode determination module 220 may determine whether a fault has been diagnosed in the throttle valve 112 based on whether a diagnostic flag for the throttle valve 112 has been set in diagnostic memory (not shown).

When the default throttle mode is enabled, the throttle valve 112 is de-energized and is remains in spring loaded position. The spring loaded position provides a predetermined amount of airflow. When the default throttle mode is enabled, the mode determination module 220 sets a mode signal to a predetermined signal that indicates that the ECM 114 is in the default throttle mode. The mode determination module 220 outputs the mode signal to the actuation module 212, the RPM trajectory module 210, the RPM control module 208, and the torque estimation module 220.

When the actuation module 212 receives the mode signal that indicates that the ECM 114 is in the default throttle mode, the actuation module 212 reroutes the air torque request to the spark control module 216 and the cylinder control module 217. Instead of the air control module 214, the spark control module 216 and the cylinder control module 217 then achieve the air torque request.

The actuation module 212 outputs the air torque request to the spark control module 216 and the cylinder control module 217 because the throttle valve 112 has been de-energized and thus is unavailable. As the throttle valve 112 is in the spring loaded position, the engine air flow is too high for idling using only spark retard. Accordingly, the cylinder control module 217 may deactivate one or more cylinders. For example only, the cylinder control module 217 may deactivate all but one of the cylinders of the engine 102. Rerouting the air torque request allows the axle torque arbitration module 204, the propulsion torque arbitration module 206, and the RPM control module 208 to operate in their normal fashion (i.e., to determine the predicted torque).

When the RPM trajectory module 210 receives the mode signal that indicates that the ECM 114 is in the default throttle mode, the RPM trajectory module 210 sets the idle RPM to a second predetermined RPM that is greater than the first predetermined RPM. The idle RPM is increased to decrease the MAP because during the default throttle mode, the MAP is increased due to the throttle valve 112 being in the spring loaded position. The increased MAP produces a low vacuum in the intake manifold 110. The low vacuum may be inadequate for a brake system that requires a vacuum to be supplied. In addition, the idle RPM is increased because less spark retard will be required to keep the RPM at lower values.

When the torque estimation module 220 receives the mode signal that indicates that the ECM 114 is in the default throttle mode, the torque estimation module 220 sets a maximum torque capacity of the engine 102 to an unmanaged torque (i.e., the estimated air torque). The unmanaged torque is an estimate of the torque that the engine 102 is capable of producing with the current airflow conditions, the spark advance set to the calibrated spark advance value, and all of the cylinders firing.

Other systems using the maximum torque capacity may then adapt their control strategies to accommodate the throttle valve 112 being in the spring loaded position. For example only, the transmission control module 194 may adapt control of the gear ratio by using lower gears (i.e., larger gear ratios) when the maximum torque capacity is set to the unmanaged torque. Using lower gears may enable the transmission control module 194 to achieve a desired axle torque despite the limited torque output capability of the engine 102 while the throttle valve 112 is de-energized.

Figure 3:
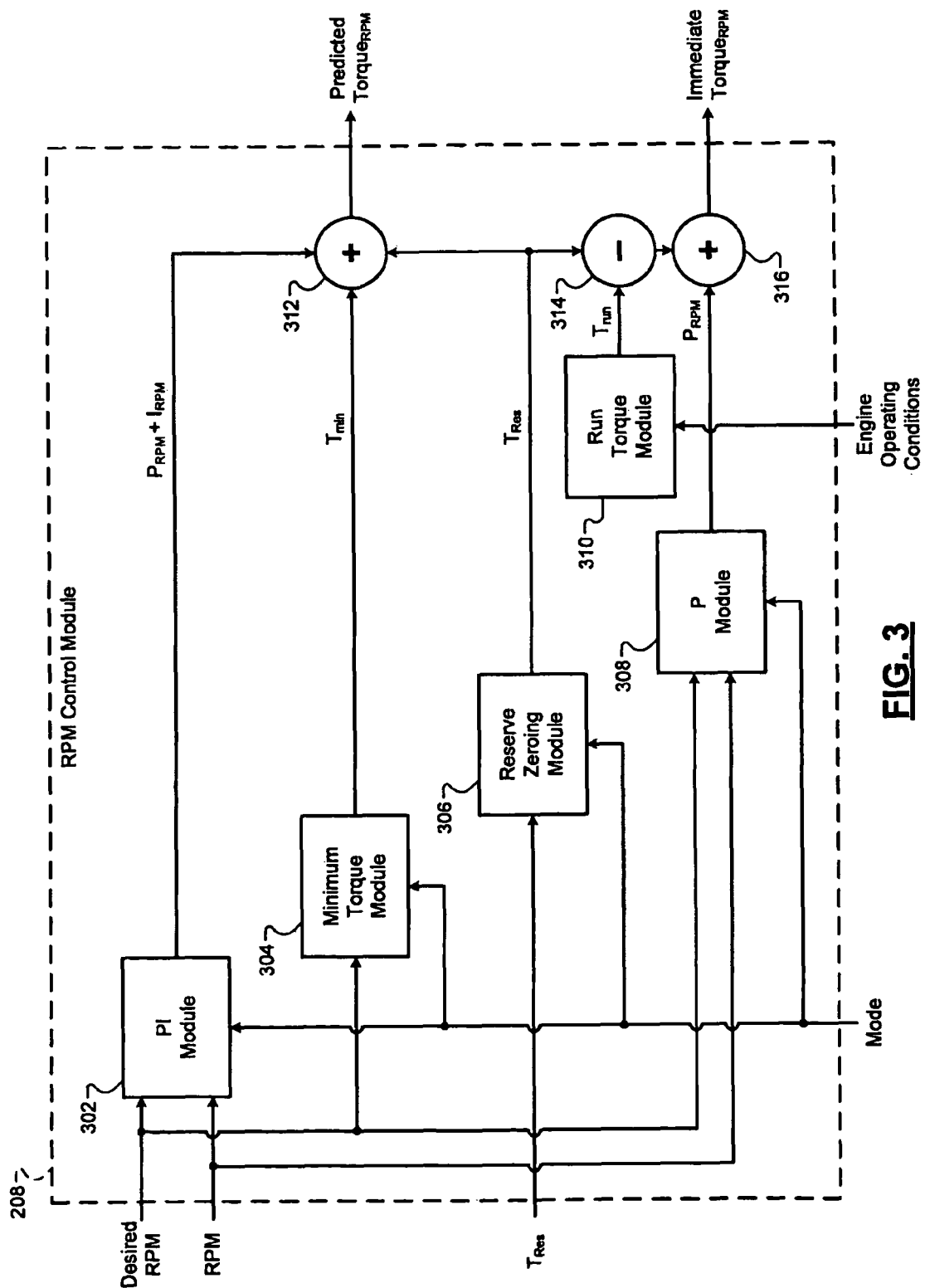
FIG. 3 is a functional block diagram of an exemplary implementation of an RPM control module according to the principles of the present disclosure.

Referring now to FIG. 3, a functional block diagram of an exemplary implementation of the RPM control module 208 is presented. The RPM control module 208 includes a proportional-integral (PI) module 302, a minimum torque module 304, a reserve zeroing module 306, and a proportional (P) module 308. The RPM control module 208 further includes a run torque module 310, a summation module 312, a subtraction module 314, and a summation module 316. When the RPM control module 208 receives the mode signal that indicates that the ECM 114 is in the default throttle mode, the RPM control module 208 operates in a different fashion as described herein.

The PI module 302 receives the desired RPM, the RPM, and the mode signal. The PI module 302 compares the desired RPM to the RPM to determine a first RPM correction factor. The PI module 302 uses a PI control scheme to meet the desired RPM.

The first RPM correction factor includes an RPM proportional (i.e., $P_{RPM}$), or a proportional offset based on the difference between the desired RPM and the RPM and a proportional gain. The first RPM correction factor further includes an RPM integral (i.e., $I_{RPM}$), or an offset based on the integral of the difference between the desired RPM and the RPM and an integral gain. Further discussion of the PI control scheme can be found in commonly assigned patent application Ser. No. 11/656,929, filed Jan. 23, 2007, and entitled "Engine Torque Control at High Pressure Ratio," the disclosure of which is incorporated herein by reference in its entirety. Additional discussion regarding PI control of the RPM can be found in commonly assigned patent application Ser. No. 11/685,735, filed Mar. 13, 2007, and entitled "Torque Based Engine Speed Control," the disclosure of which is incorporated herein by reference in its entirety.

When the PI module 302 does not receive the mode signal that indicates that the ECM 114 is in the default throttle mode, the PI module 302 sets the proportional gain to a first predetermined gain. The PI module 302 sets the integral gain to a second predetermined gain. When the PI module 302 receives the mode signal that indicates that the ECM 114 is in the default throttle mode, the PI module 302 sets the proportional gain to a third predetermined gain instead of the first predetermined gain. The PI module 302 sets the integral gain to a fourth predetermined gain instead of the second predetermined gain.

The proportional gain and the integral gain are each set to different gain values because during the default throttle mode, the spring-loaded position of the throttle valve 112 results in a high MAF. With the high MAF, only a partial number of the cylinders are used to maintain the idle RPM. Running on the partial number of the cylinders results in different response characteristics for the ECM 114 and thus a need for the different gain values.

The minimum torque module 304 receives the desired RPM and the mode signal. When the minimum torque module 304 does not receive the mode signal that indicates that the ECM 114 is in the default throttle mode, the minimum torque module 304 determines a minimum torque required to maintain the desired RPM. The minimum torque is determined from, for example, a look-up table. The minimum torque is determined to prevent engine misfires (i.e., poor combustion in an engine).

When the minimum torque module 304 does receive the mode signal that indicates that the ECM 114 is in the default throttle mode, the minimum torque module 304 is disabled. The minimum torque module 304 is disabled because during the default throttle mode, the spring-loaded position of the throttle valve 112 results in a high MAF. With the high MAF and an optimal spark advance, engine misfires are unlikely to occur. In addition, disabling the minimum torque module 304 increases the range of the predicted torque of the RPM control module 208. The increased range of the predicted torque may be needed for the engine 102 to limp home.

The reserve zeroing module 306 receives the indication of the reserve torque ($T_{Res}$) provided by the reserves/loads module 211 and the mode signal from the mode determination module 220. When the reserve zeroing module 306 does not receive the mode signal that indicates that the ECM 114 is in the default throttle mode, the reserve zeroing module 306 outputs the indicated reserve torque as the reserve torque ($T_{Res}$). The reserve torque is an additional amount of torque that is incorporated to compensate for unknown loads that can suddenly load the engine system 100. Further discussion of the reserve torque can be found in commonly assigned patent application Ser. No. 11/972,090, filed Jan. 10, 2008, and entitled "Reserve Torque Management for Engine Speed Control," the disclosure of which is incorporated herein by reference in its entirety.

When the reserve zeroing module 306 does receive the mode signal that indicates that the ECM 114 is in the default throttle mode, the reserve zeroing module 306 sets the reserve torque ($T_{Res}$) to zero. The reserve zeroing module 306 sets the reserve torque to zero because during the default throttle mode, the spring-loaded position of the throttle valve 112 results in a high MAF. With the high MAF, the idle RPM may be maintained without the reserve torque.

The P module 308 receives the desired RPM, the RPM, and the mode signal. The P module 308 compares the desired RPM to the RPM to determine a second RPM correction factor. The P module 308 uses a P control scheme to meet the desired RPM.

The second RPM correction factor includes the RPM proportional. When the P module 308 does not receive the mode signal that indicates that the ECM 114 is in the default throttle mode, the P module 308 determines the RPM proportional further based on the first proportional gain. When the P module 308 receives the mode signal that indicates that the ECM 114 is in the default throttle mode, the P module 308 determines the RPM proportional further based on the second proportional gain instead of the first proportional gain.

The run torque module 310 receives data on engine operating conditions. For example only, the engine operating conditions may include, but are not limited to, the RPM, the MAF, the spark advance, the intake cam phaser positions, and/or the exhaust cam phaser positions. The run torque module 310 determines a run torque based on the engine operating conditions.

The summation module 312 receives the first RPM correction factor, the minimum torque, and the reserve torque. The summation module 312 sums the first RPM correction factor, the minimum torque, and the reserve torque to determine the predicted torque of the RPM control module 208. The subtraction module 314 receives the reserve torque and the run torque and subtracts the reserve torque from the run torque. The summation module 316 receives the difference between the run torque and the reserve torque and the second RPM correction factor. The summation module 316 sums the difference between the run torque and the reserve torque and the second RPM correction factor to determine the immediate torque of the RPM control module 208.

Figure 4:
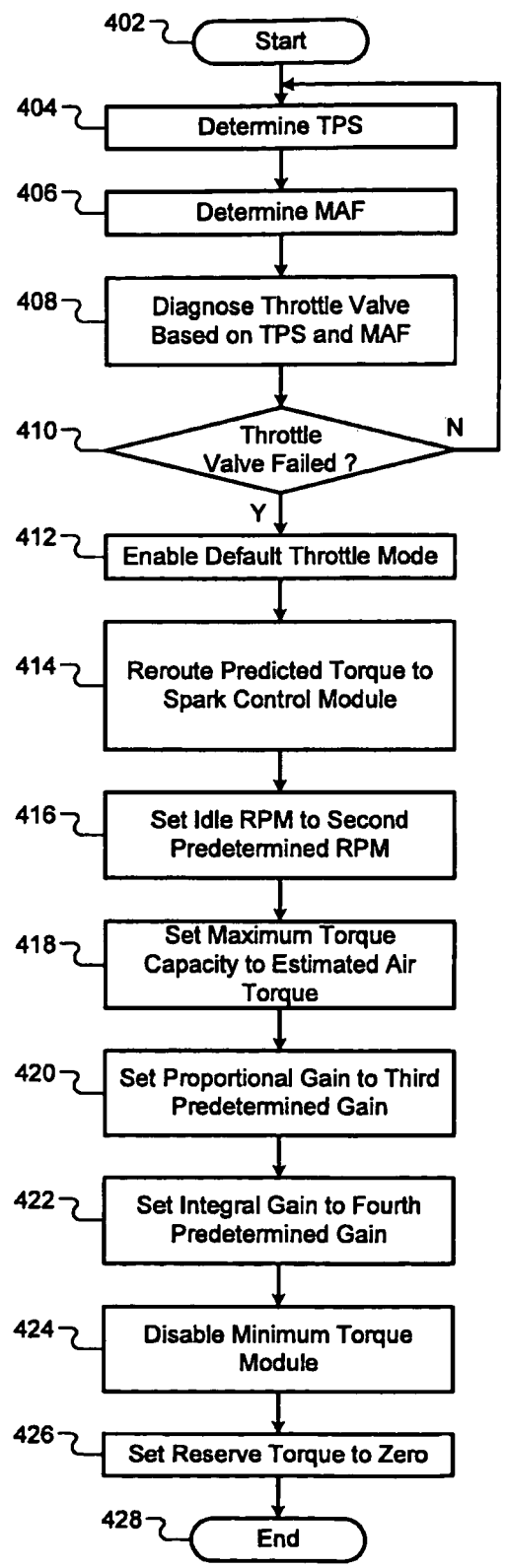
FIG. 4 is a flowchart of exemplary steps performed by the engine control module according to the principles of the present disclosure.

Referring now to FIG. 4, a flowchart depicting exemplary steps performed by the ECM 114 is presented. Control begins in step 402. In step 404, the TPS is determined. In step 406, the MAF is determined. In step 408, the throttle valve 112 is diagnosed based on the TPS and the MAF.

In step 410, control determines whether the throttle valve 112 has failed. If true, control continues in step 412. If false, control returns to step 404. In step 412, the default throttle mode is enabled. In step 414, the air torque request torque is re-routed to the spark control module 216.

In step 416, the idle RPM is set to the second predetermined RPM. In step 418, the maximum torque capacity is set to the estimated air torque (i.e., the unmanaged torque). In step 420, the proportional gain is set to the third predetermined gain. In step 422, the integral gain is set to the fourth predetermined gain. In step 424, the minimum torque module 304 is disabled. In step 426, the reserve torque is set to zero. Control ends in step 428.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
   an air control module that controls a throttle valve based on a first desired torque when said throttle valve is in an operable state; and
   a spark control module that, when said throttle valve is in a fault state, controls spark advance based on said first desired torque and a second desired torque,
   wherein said throttle valve is maintained in a predetermined fault position when in said fault state.

2. The engine control system of claim 1 further comprising a cylinder control module that selectively disables combustion within one or more cylinders of an engine based on said first and second desired torques when said throttle valve is in said fault state.

3. The engine control system of claim 1 further comprising an engine speed control module that determines said first desired torque based on a minimum torque, a reserve torque, and a proportional-integral (PI) offset determined based on a difference between a desired engine speed and a measured engine speed and that determines said second desired torque based on a proportional offset determined based on said difference, said reserve torque, and a run torque.

4. The engine control system of claim 3 further comprising a trajectory module that sets said desired engine speed to a first predetermined idle speed when said throttle valve is in said operable state and that increases said desired engine speed to a second predetermined idle speed when said throttle valve is in said fault state.

5. The engine control system of claim 3 wherein said engine speed control module disables determining said first desired torque based on said minimum torque when said throttle valve is in said fault state.

6. The engine control system of claim 3 wherein said engine speed control module sets said reserve torque to zero when said throttle valve is in said fault state.

7. The engine control system of claim 3 wherein said engine speed control module determines said proportional and PI offsets based on first gains when said throttle valve is in said operable state and determines said proportional and PI offsets based on second gains when said throttle valve is in said fault state, and
   wherein said first gains are one of greater than and less than said second gains.

8. The engine control system of claim 3 wherein said engine speed control module sets said first desired torque to a predetermined minimum when said first desired torque is less than said predetermined minimum while said throttle valve is in said operable state and outputs said first desired torque when said first desired torque is less than said predetermined minimum while said throttle valve is in said fault state.

9. The engine control system of claim 1 further comprising a torque estimation module that determines an estimated air torque based on current operating conditions and a predetermined spark advance and that sets a maximum torque capacity of an engine equal to said estimated air torque when said throttle valve is in said fault state.

10. The engine control system of claim 9 further comprising a transmission control module that controls a gear ratio of a transmission based on said maximum torque capacity.

11. An engine control method comprising:
    controlling a throttle valve based on a first desired torque when said throttle valve is in an operable state; and,
    when said throttle valve is in a fault state, controlling spark advance based on said first desired torque and a second desired torque,
    wherein said throttle valve is maintained in a predetermined fault position when in said fault state.

12. The engine control method of claim 11 further comprising selectively disabling combustion within one or more cylinders of an engine based on said first and second desired torques when said throttle valve is in said fault state.

13. The engine control method of claim 11 further comprising:
    determining said first desired torque based on a minimum torque, a reserve torque, and a proportional-integral (PI) offset determined based on a difference between a desired engine speed and a measured engine speed; and
    determining said second desired torque based on a proportional offset determined based on said difference, said reserve torque, and a run torque.

14. The engine control method of claim 13 further comprising:
    setting said desired engine speed to a first predetermined idle speed when said throttle valve is in said operable state; and
    increasing said desired engine speed to a second predetermined idle speed when said throttle valve is in said fault state.

15. The engine control method of claim 13 further comprising disabling determining said first desired torque based on said minimum torque when said throttle valve is in said fault state.

16. The engine control method of claim 13 further comprising setting said reserve torque to zero when said throttle valve is in said fault state.

17. The engine control method of claim 13 further comprising:
    determining said proportional and PI offsets based on first gains when said throttle valve is in said operable state; and
    determining said proportional and PI offsets based on second gains when said throttle valve is in said fault state,
    wherein said first gains are one of greater than and less than said second gains.

18. The engine control method of claim 13 further comprising:
    setting said first desired torque to a predetermined minimum when said first desired torque is less than said predetermined minimum while said throttle valve is in said operable state; and outputting said first desired torque when said first desired torque is less than said predetermined minimum while said throttle valve is in said fault state.

19. The engine control method of claim 11 further comprising:
   determining an estimated air torque based on current operating conditions and a predetermined spark advance; and
   setting a maximum torque capacity of an engine equal to said estimated air torque when said throttle valve is in said fault state.

20. The engine control method of claim 19 further comprising controlling a gear ratio of a transmission based on said maximum torque capacity.

* * * * *